United States Patent
Markowz et al.

(10) Patent No.: US 9,948,096 B2
(45) Date of Patent: Apr. 17, 2018

(54) METHOD FOR PROVIDING CONTROL POWER TO STABILIZE AN ALTERNATING CURRENT NETWORK, USING AN ENERGY ACCUMULATOR

(71) Applicants: Georg Markowz, Alzenau (DE); Carsten Kolligs, Bottrop (DE); Erdem Simsek, Essen (DE); Anna Flemming, Frankfurt (DE); Dennis Gamrad, Voerde (DE); Sebastien Cochet, Ratingen (DE); Wolfgang Schweissthal, Mandelbachtal (DE)

(72) Inventors: Georg Markowz, Alzenau (DE); Carsten Kolligs, Bottrop (DE); Erdem Simsek, Essen (DE); Anna Flemming, Frankfurt (DE); Dennis Gamrad, Voerde (DE); Sebastien Cochet, Ratingen (DE); Wolfgang Schweissthal, Mandelbachtal (DE)

(73) Assignees: Evonik Degussa GmbH, Essen (DE); STEAG Power Saar GmbH, Saarbruecken (DE)

( * ) Notice: Subject to any disclaimer, the term of this patent is extended or adjusted under 35 U.S.C. 154(b) by 158 days.

(21) Appl. No.: 14/654,367

(22) PCT Filed: Dec. 9, 2013

(86) PCT No.: PCT/EP2013/075952
§ 371 (c)(1),
(2) Date: Jun. 19, 2015

(87) PCT Pub. No.: WO2014/095457
PCT Pub. Date: Jun. 26, 2014

(65) Prior Publication Data
US 2015/0311712 A1    Oct. 29, 2015

(30) Foreign Application Priority Data

Dec. 21, 2012    (DE) .................. 10 2012 113 051

(51) Int. Cl.
| | | |
|---|---|---|
| H02J 3/00 | (2006.01) | |
| H02J 3/28 | (2006.01) | |
| H02J 3/24 | (2006.01) | |

(52) U.S. Cl.
CPC ........ *H02J 3/00* (2013.01); *H02J 3/24* (2013.01); *H02J 3/28* (2013.01)

(58) Field of Classification Search
CPC ........................................... H02J 3/00
See application file for complete search history.

(56) References Cited

U.S. PATENT DOCUMENTS

| | | |
|---|---|---|
| 2,899,275 A | 8/1959 | Cherrier |
| 2,997,434 A | 8/1961 | Gäbler et al. |

(Continued)

FOREIGN PATENT DOCUMENTS

| | | | |
|---|---|---|---|
| WO | WO 2013/068233 A2 | 5/2013 | |
| WO | WO 2014/095343 A2 | 6/2014 | |

(Continued)

*Primary Examiner* — Hai L Nguyen
(74) *Attorney, Agent, or Firm* — Oblon, McClelland, Maier & Neustadt, L.L.P.

(57) ABSTRACT

The present invention relates to a method for providing control power to stabilize an AC electrical grid, comprising an energy store which can take up and emit electrical energy, wherein for the purpose of providing the control power, the energy store is used together with a differential power provider, wherein the AC electrical grid operates at a predefined frequency and a frequency band around the predefined frequency is defined and the control power to be provided in the case of a frequency deviation within the (Continued)

frequency band is provided by the energy store to the extent of more than 50%, relative to the total control power to be provided.

58 Claims, 3 Drawing Sheets

(56) References Cited

U.S. PATENT DOCUMENTS

| | | |
|---|---|---|
| 3,214,266 A | 10/1965 | Whaley |
| 3,674,668 A | 7/1972 | Bjornson et al. |
| 4,144,444 A | 3/1979 | Dementiev et al. |
| 4,364,806 A | 12/1982 | Rogers |
| 4,808,290 A | 2/1989 | Hilbig |
| 5,411,641 A | 5/1995 | Trainham, III et al. |
| 5,470,541 A | 11/1995 | Koch et al. |
| 5,529,669 A | 6/1996 | Koch et al. |
| 7,839,027 B2 | 11/2010 | Shelton et al. |
| 7,955,490 B2 | 6/2011 | Fang et al. |
| 8,198,863 B1 | 6/2012 | Wortham |
| 8,227,929 B2 * | 7/2012 | Burra ............... H02J 3/24 290/44 |
| 8,378,206 B2 | 2/2013 | Schuette et al. |
| 9,051,526 B2 | 6/2015 | Markowz et al. |
| 2002/0000085 A1 | 1/2002 | Hall et al. |
| 2003/0065042 A1 | 4/2003 | Shaw |
| 2004/0157940 A1 | 8/2004 | Dalton |
| 2005/0065391 A1 | 3/2005 | Gattis et al. |
| 2005/0116687 A1 | 6/2005 | Yokomizo et al. |
| 2005/0238933 A1 | 10/2005 | Kim et al. |
| 2006/0122738 A1 | 6/2006 | Yamada et al. |
| 2006/0276938 A1 | 12/2006 | Miller |
| 2007/0216165 A1 | 9/2007 | Oohara et al. |
| 2007/0282151 A1 | 12/2007 | Richards |
| 2008/0023564 A1 | 1/2008 | Hall |
| 2008/0290833 A1 | 11/2008 | Hayashi |
| 2009/0048716 A1 | 2/2009 | Marhoefer |
| 2009/0128159 A1 | 5/2009 | Nakatsuji |
| 2010/0231045 A1 | 9/2010 | Collins et al. |
| 2010/0253149 A1 | 10/2010 | Iida et al. |
| 2011/0062722 A1 | 3/2011 | Sirdeshpande et al. |
| 2011/0148205 A1 | 6/2011 | Moon |
| 2011/0245987 A1 | 10/2011 | Pratt et al. |
| 2012/0176088 A1 | 7/2012 | Lee |
| 2012/0215368 A1 | 8/2012 | Sharma |
| 2012/0248873 A1 | 10/2012 | Oudalov et al. |
| 2012/0316690 A1 | 12/2012 | Li et al. |
| 2012/0323386 A1 | 12/2012 | Ito |
| 2014/0292080 A1 | 10/2014 | Markowz et al. |
| 2014/0306527 A1 | 10/2014 | Markowz et al. |
| 2014/0309801 A1 | 10/2014 | Markowz et al. |
| 2014/0312689 A1 | 10/2014 | Markowz et al. |
| 2014/0316601 A1 | 10/2014 | Markowz et al. |
| 2014/0324243 A1 | 10/2014 | Markowz et al. |
| 2014/0327304 A1 | 11/2014 | Markowz et al. |
| 2014/0327404 A1 | 11/2014 | Markowz et al. |
| 2014/0368039 A1 | 12/2014 | Markowz et al. |
| 2015/0001944 A1 | 1/2015 | Markowz et al. |
| 2015/0218475 A1 | 8/2015 | Strese et al. |
| 2015/0236511 A1 | 8/2015 | Strese et al. |
| 2015/0298093 A1 | 10/2015 | Markowz et al. |
| 2015/0315936 A1 | 11/2015 | Markowz et al. |

FOREIGN PATENT DOCUMENTS

| | | |
|---|---|---|
| WO | WO 2014/095346 A2 | 6/2014 |
| WO | WO 2014/139878 A1 | 9/2014 |
| WO | WO 2014/180830 A1 | 11/2014 |
| WO | WO 2014/180839 A1 | 11/2014 |
| WO | WO 2015/036321 A1 | 3/2015 |
| WO | WO 2015/082319 A1 | 6/2015 |
| WO | WO 2015/091422 A1 | 6/2015 |
| WO | WO 2015/150119 A1 | 10/2015 |

* cited by examiner

METHOD FOR PROVIDING CONTROL POWER TO STABILIZE AN ALTERNATING CURRENT NETWORK, USING AN ENERGY ACCUMULATOR

The present invention relates to a method for providing control power to stabilize an AC electrical grid, comprising an energy store, and to a device for carrying out such a method.

BACKGROUND

Electrical grids are used to distribute electricity from usually a number of energy generators in large areas to many users and to supply households and industry with energy. Energy generators, usually in the form of power plants, provide the energy required for this. In general, the generation of electricity is planned and provided with regard to the forecast consumption.

However, unplanned fluctuations can occur both during generation and during consumption of energy. These may arise on the energy generator side for example as a result of a power plant or part of the electrical grid failing or, for example in the case of renewable energy sources such as wind, the energy generation being higher or lower than forecast. It is also possible with respect to the consumers for unexpectedly high or low levels of consumption to occur. The failure of part of the electrical grid, for example, cutting off some consumers from the energy supply, may lead to a sudden reduction in the electricity consumption.

This generally leads to fluctuations in the grid frequency in electrical grids due to unplanned deviations of power generation and/or consumption. In Europe, for example, the desired AC frequency is 50.00 Hz. A reduction in consumption as compared with the planned level leads to an increase in the frequency when power is fed in as planned by the energy generators; the same applies to an increase in the electricity production as compared with the planned level when consumption is as planned. On the other hand, a reduction in the power produced by the energy generators as compared with the planned level leads to a reduction in the grid frequency when consumption is as planned; the same applies to an increase in consumption as compared with the planned level when generation is as planned.

For reasons of grid stability, it is necessary to keep these deviations within defined boundaries. For this purpose, depending on the degree and direction of the deviation, positive control power must be specifically provided by connecting additional generators or disconnecting consuming entities or negative control power must be specifically provided by disconnecting generators or connecting consuming entities. There is a general need for cost-effective and efficient provision of these supplies of control power, where the requirements for the capacities to be maintained and the dynamic characteristic of the control power sources or sinks can vary according to the characteristics of the electrical grid.

In Europe, for example, there is a code of practice (UCTE Handbook), which describes three different categories of control power. In it, the respective requirements and the types of control power are also defined. The types of control power differ, inter alia, in the requirements in respect of the dynamic characteristic and the duration of power provision. Moreover, they are used differently with regard to the boundary conditions. Primary control power (PCP) is to be provided Europe-wide by all of the sources involved independently of the place of origin of the disturbance, this being substantially in proportion to the frequency deviation at the given time. The absolute maximum power has to be provided when there are frequency deviations of minus 200 mHz and below (in absolute terms), the absolute minimum power has to be provided when there are frequency deviations of plus 200 mHz and above. With regard to the dynamic characteristic, it holds true that, from the non-operative state, the respective maximum power (in terms of the absolute value) must be provided within 30 seconds. By contrast, secondary control power (SCP) and minutes reserve power (MRP) are to be provided in the balancing spaces in which the disturbance has occurred. Their task is to compensate as quickly as possible for the disturbance and thus ensure that the frequency is restored as quickly as possible to the desired range, preferably at the latest after 15 minutes. With regard to the dynamic characteristic, less stringent requirements are made of the SCP and the MRP (5 and 15 minutes, respectively, until full power provision after activation); at the same time these powers should also be provided over longer periods of time than primary control power.

In the electrical grids operated heretofore, a large part of the control power is provided by conventional power plants, in particular coal and nuclear power plants. This results in two fundamental problems. Firstly, the conventional power plants providing control power are not operated at full load, and consequently at maximum levels of efficiency, but slightly below, in order to be able when required to provide positive control power, possibly over a theoretically unlimited time period.

For long-term provision of control power, therefore, the required control power sources generally have to be operated at partial load in order to be able to take up or output additional energy as necessary. If a power plant is used, for example, then this would have to be operated at partial load in order also to be able to provide additional positive control power as necessary. Analogously, a consumer would have to be operated at partial load in order to be able to increase the load in the event of additional negative control power being required.

These partial-load modes of operation are generally disadvantageous. In most conventional power plants (e.g. coal-fired power plants or gas-fired power plants) partial-load operation can result in a lower efficiency of the electricity generation and higher specific emissions. This holds true particularly if the load is very low, relative to the maximum power. Moreover, increased specific fixed costs arise when there is reduced utilization of capacity. In the case of consumers operated at partial load, productivity decreases, and so does the efficiency. An electrolysis installation used for chemical production has a lower productivity in accordance with the load reduction and only a smaller proportion of the consumed energy is converted into the product, that is to say that a larger amount of energy is required for the same amount of product.

Secondly, with increasing expansion and increasingly preferred use of renewable energy sources, there are fewer and fewer conventional power plants in operation, which however is often the basic prerequisite for providing supplies of control power.

For this reason, approaches have been developed for the increasing use of stores in order to store negative control power and to provide it as positive control power as necessary.

DE 10 2008 002 839 A1 discloses operating energy consumers in the form of elevators in such a way that unused elevators in an entire region are driven to upper stories in order to provide negative control power. In other words, if negative control power is required, the power of a consumer is increased.

DE 10 2009 018 126 A1 discloses a method for providing control power which involves generating and storing a flammable gas with renewable energy sources. The flammable gas can be converted back into electricity precisely in periods of time with high residual load of the electrical grid. In this case, therefore, the power of a gas-fired power plant is increased if a positive control power is required. What is disadvantageous here is that the gas-fired power plant is operated at high power and thus at high efficiency only when there is a full control requirement, that is to say only in rare cases.

What is disadvantageous here, therefore, is that currently there is no possibility of operating energy generators or energy consumers for providing control power as efficiently as possible just like during operation for providing power without control and thus with the best possible efficiency, and also over a relatively long time, in order to make available control power for stabilizing the electrical grid. Oversizing is uneconomic in any case.

The use of hydro pumped-storage plants for producing control power is prior art. In Europe, all three types of control power mentioned above are produced by pumped-storage facilities. Hydro pumped-storage plants are however also repeatedly cited as currently the most cost-effective technology for storing and retrieving preferably forms of renewable energy, to allow energy supply and demand to be better adapted to one another in terms of time. The potential for the expansion of storage capacities—in particular in Norway—is a controversial subject of discussion since use requires considerable capacities in power lines to be approved and installed. Consequently, use for energy-efficient load management is in competition with the provision of control power.

Against this background, in the area of primary control power many plans for also using other storage technologies, such as for example flywheel mass and battery stores, for the provision of control power have recently been investigated and described.

US 2006/122738 A1 discloses an energy management system comprising an energy generator and an energy store, wherein the energy store can be charged by the energy generator. This is intended to enable an energy generator that does not ensure uniform energy generation in normal operation, such as for example the increasingly favored renewable energy sources such as wind-power or photovoltaic power plants, to output their energy more uniformly into the electrical grid. A disadvantage of this is that, although a single power plant can be stabilized in this way, all other disturbances and fluctuations of the electrical grid cannot be counterbalanced, or can be counterbalanced only to a very limited extent.

It is known from WO 2010 042 190 A2 and JP 2008 178 215 A to use energy stores for providing positive and negative control power. If the grid frequency leaves a tolerance range around the wanted grid frequency, either energy is provided from the energy store or is taken up in the energy store in order to regulate the grid frequency. DE 10 2008 046 747 A1 also proposes operating an energy store in an island electrical grid in such a way that the energy store is used to compensate for consumption peaks and consumption minima. What is disadvantageous about this is that the energy stores do not have the necessary capacity to compensate for a relatively long disturbance or a plurality of disturbances one after another that act in the same direction with regard to the frequency deviation.

In the article "Optimizing a Battery Energy Storage System for Primary Frequency Control" by Oudalov et al., in IEEE Transactions on Power Systems, Vol. 22, No. 3, August 2007, the dependence of the capacity of an accumulator on technical and operational boundary conditions is determined in order that said accumulator can provide primary control power according to the European standards (UCTE Handbook). It has been found that, on account of storage and retrieval losses, in the long term repeated charging or discharging of the store at different time intervals is unavoidable. In this respect, the authors propose the periods of time in which the frequency is in the dead band (i.e. in the frequency range in which no control power is to be provided). Nevertheless, in the short term or temporarily the situation can occur that the store is overcharged. The authors propose for such cases the (limited) use of loss-generating resistors which in the extreme case take up the complete negative nominal control power, that is to say have to be designed for that. Besides the additional capital expenditure requirement for the resistors and the cooling thereof, this leads, however, as already mentioned by the authors themselves to more or less undesirable energy degradation, wherein the waste heat that arises generally cannot be utilized. The authors demonstrate that reduced usage of loss generation is possible only by means of a higher storage capacity, associated with higher capital expenditure costs.

Accumulators and other energy stores can take up or output energy very rapidly, as a result of which they are suitable, in principle, for providing PCP. What is disadvantageous about this, however, is that very large capacities of the accumulators have to be provided in order to be able to supply the control power also over a relatively long period of time or repeatedly. However, accumulators having a very high capacity are also very expensive.

On account of the losses during the storing and outputting of energy, the energy store, such as an accumulator for example, is discharged earlier or later in the event of statistically symmetrical deviation of the grid frequencies from the desired value as a result of operation. Therefore, it is necessary to charge the energy store more or less regularly in a targeted manner. This charging current may need to be paid for separately.

In the context of the invention it has been found that occasionally considerable quantities of energy are fed in or output monotonically as shown by an analysis of real frequency profiles by the inventors. This leads to a correspondingly high change in the state of charge for a given storage capacity. Large changes in the state of charge in turn tend to result in more rapid aging than small changes in the state of charge. Consequently, either the energy store reaches the end of its life sooner and has to be replaced sooner, or the capacity has to be increased a priori in order to reduce the relative change in the state of charge. Both result in an increase in the capital expenditure costs.

In addition, consistently complying with the guidelines for the prequalification of primary control technologies necessitates keeping corresponding power reserves available at any arbitrary time during operation and thus for any arbitrary state of charge of the energy store. This requirement (currently in Germany: the marketed primary control power for a duration of 15 min) has the effect that a corresponding capacity additionally has to be kept in reserve, this capacity increasing capital expenditure costs. In fact, such a reserve would (on a statistical basis) only be used very rarely.

SUMMARY

In view of the prior art it is an object of the present invention, therefore, to provide a technically improved method for providing control power to stabilize an AC electrical grid, which method is not beset by the disadvantages of conventional methods.

In particular, the intention is to make it possible to provide control power in conjunction with a high efficiency of the components used.

Furthermore, the method should be able to be carried out as simply and cost-effectively as possible. In particular, the installations with which the method can be carried out should be associated with as little capital expenditure as possible with regard to the control power provided.

In this case, the intention is to make it possible to provide control power by means of energy generators or energy consumers which can be operated under conditions that are as optimal as possible, very particularly in conjunction with the highest possible efficiency.

A further object of the invention should be considered that of intending the capacity of the energy store to be as low as possible in order to provide the required control power.

In addition, it would also be advantageous if a reduced aging burden could be achieved. Furthermore, it would also be desirable to provide the primary control power while avoiding charging or discharging in the meantime. Alternatively, the intention should be to strive to reduce at least the number of charging or discharging processes required for maintaining the operational capability.

Furthermore, it is a stated object of the present invention to find a method in which the described disturbances of the electrical grid and simultaneously trading operations are avoided or reduced. Furthermore, the method should be able to be carried out as simply and cost-effectively as possible.

Furthermore, the energy generators and energy consumers are intended to have an energy yield that is as efficient as possible as control power suppliers.

The method according to the invention is additionally intended to be suitable for being able to provide the required control power as rapidly as possible, as necessary.

Furthermore, the method should be able to be carried out with the fewest possible method steps, wherein the latter should be simple and reproducible.

Further objects not mentioned explicitly will become apparent from the overall context of the following description and the claims.

These objects and further objects, which are not explicitly mentioned but can readily be derived or deduced from the contexts discussed in the introduction hereof, are achieved by a method having all the features of patent claim 1. Expedient modifications of the method according to the invention for providing control power for an electrical grid are afforded protection in dependent claims 2 to 17. Furthermore, patent claims 18 to 20 relate to a device for carrying out such a method.

BRIEF DESCRIPTION OF THE DRAWINGS

Exemplary embodiments of the invention are explained below with reference to two schematically illustrated figures, but without restricting the invention here. In detail.

DETAIL DESCRIPTION

Figure 1:
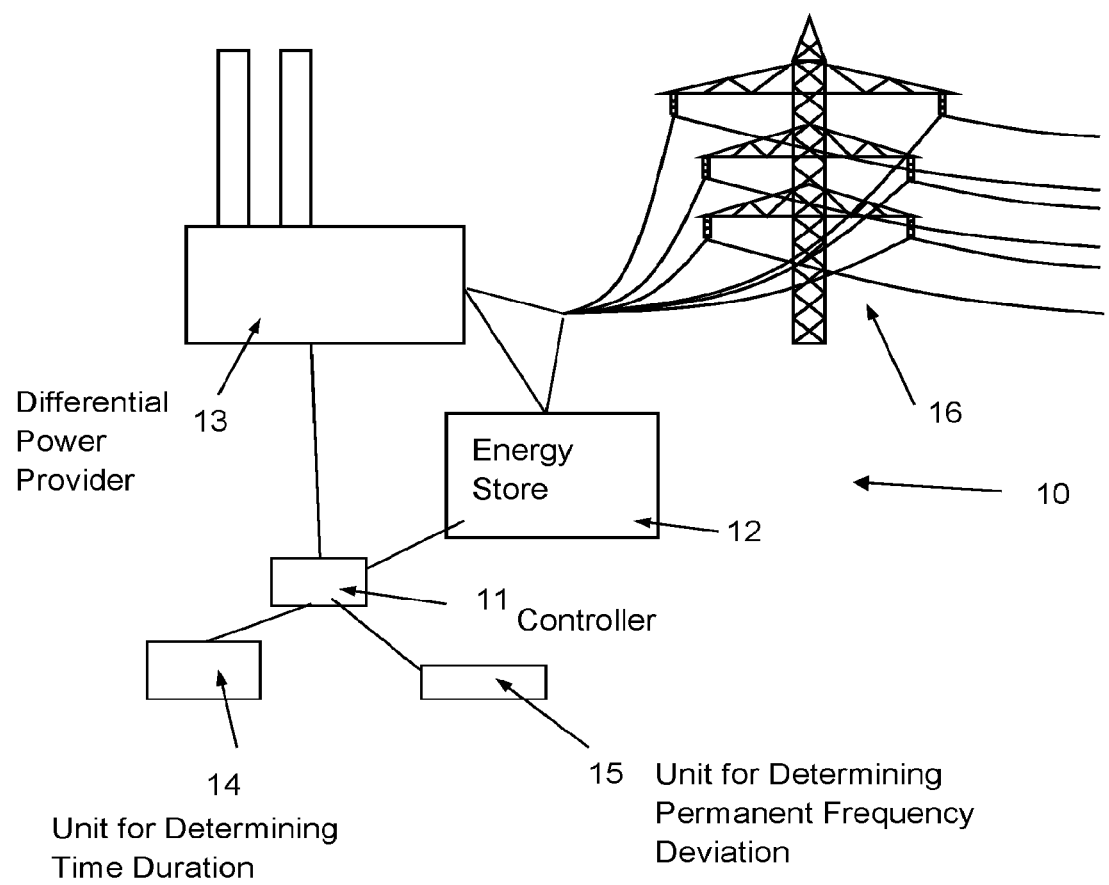
FIG. 1: shows a schematic illustration of a device according to the invention for providing control power.

The present invention accordingly relates to a method for providing control power to stabilize an AC electrical grid, comprising an energy store which can take up and emit electrical energy, which method is characterized in that for the purpose of providing the control power, the energy store is used together with a differential power provider, wherein the AC electrical grid operates at a predefined frequency and a frequency band around the predefined frequency is defined and the control power to be provided in the case of a frequency deviation within the frequency band is provided by the energy store to the extent of more than 50%, relative to the total control power to be provided.

The method according to the invention makes it possible, in an unforeseeable manner, to provide a method for providing control power to stabilize an AC electrical grid, which method is not beset by the disadvantages of conventional methods.

In particular, the method can be carried out very simply and cost-effectively since the storage capacity required for full availability can be provided more cost-effectively or the number of charging and discharging processes which have to be performed for setting the state of charge of the energy store with external energy sources or sinks can be reduced. In this case, it can be noted that the energy store can procure power via the electrical grid by energy trading. Said power has to be purchased and called up at a specific time, since otherwise a disturbance of the system is present. The actual grid frequency is unimportant for this process, since the frequency of the electrical grid is not influenced when a power is simultaneously fed in and drawn in a planned manner. What is important, rather, is that said power is fed in and drawn as synchronously as possible. Given a constant capacity of the energy store, the operational lifetime of the store can be increased owing to the reduced charging/discharging cycles, wherein this constitutes for accumulators, in particular, an important aspect which can surprisingly be improved by the present invention.

Furthermore, with use of galvanic elements, such as accumulators, the capacity of expensive energy stores can be kept very low in order to provide a required control power.

Furthermore, the energy generators and/or energy consumers preferably used as differential power provider have a very efficient energy yield as control power suppliers. Furthermore, the present invention makes it possible to provide control power in conjunction with a high efficiency of the components used.

By means of a Fourier analysis of the state of charge of energy stores, the inventors were surprisingly able to establish that fluctuations in the state of charge having a very short period duration are also accompanied by those having a significantly longer period duration. The latter lead to fluctuation processes with a significantly smaller number of cycles. These charge fluctuations can be at least partly compensated for on account of the high efficiency with a differential power provider. By virtue of this configuration, the differential power provider can be operated at a higher efficiency since part of the power can be provided by the energy store. Furthermore, the differential power provider can be operated nearer to, preferably at, the efficiency optimum. The greater the control power to be provided by an energy consumer and/or energy generator, the more the efficiency under the associated continuous load under which the differential power provider is operated deviates from the efficiency optimum, relative to the maximum power to be provided by the differential power provider. Furthermore, the differential power provider is used relatively infrequently, with the result that these installations can be operated at these high efficiencies on a more permanent basis. The fluctuations that occur with a high frequency can be moderated more expediently with an energy store, however.

In this case, the power electronics of the energy store can be designed for a lower power output if control energy has to be provided by the energy store only for a partial range of the contracted maximum control power, in comparison with the total contracted control power. Said power electronics can accordingly be obtained more favorably, with the result that the capital expenditure costs for providing a predefined contracted control power can be reduced.

The method according to the invention is additionally suitable for providing the required control power very rapidly.

Furthermore, the differential power providers, in particular the energy generators and/or energy consumers, can provide a sufficient amount of positive or negative control power in a targeted manner independently of the magnitude and direction of the deviation of the grid frequency.

Furthermore, the method can be carried out with very few method steps, wherein the latter are simple and reproducible.

The present method serves for providing control power to stabilize an AC electrical grid. As already set out in the introduction, in an AC electrical grid the frequency changes if the equilibrium between energy consumption and energy provision is not maintained.

The control energy or control power is output to the electrical grid (positive control energy or positive control power) or taken up from the electrical grid (negative control energy or negative control power). Positive control power can be fed into the grid by energy feed-in, for example energy input from an energy store, or by connecting a power plant, or by restricting a consumer. Negative control power can be fed into the grid by energy being taken up by an energy store, by restricting an energy source, for example a power plant, or by connecting a consumer into the grid. Further important information on this can be found in the prior art, reference being made in particular to the documents discussed in the introduction. It should be stated in this context that the terms control power and control energy have a similar meaning for the purposes of this invention.

Usually, control power is made available to the grid operator for a specific nominal power from the provider. The nominal power should be understood in the present case to mean the power with which the control power source which is operated by a method according to the invention is at least prequalified. However, the prequalification power can be higher than the nominal power which is maximally made available to the grid operator. Said nominal power can also be designated as the contracted maximum power, since this power is provided as a maximum to the grid.

The method according to the invention serves for stabilizing an AC electrical grid. AC electrical grids are distinguished by a change in the polarity of the electric current, positive and negative instantaneous values complementing one another such that the current is zero on average over time. These grids are generally used for transmitting electrical energy.

Usually, the AC electrical grids are operated with a predefined frequency, which is 50.000 Hz currently in Europe, particularly in Germany. In North America, on the other hand, the set frequency is 60.000 Hz.

Currently, said predefined frequency is not fixed, but rather is slightly varied in order to adapt the so-called grid time, which serves, inter alia, as a timer for clocks, to the coordinated universal time. Consequently, such an AC electrical grid operates at a variable predefined frequency. In accordance with the standards currently applicable in Europe, in the event of a deviation of ±20 seconds between the grid time and the universal time, the predefined frequency is decreased or increased by 10 mHz depending on the deviation of the grid time, such that the predefined frequency can currently assume values of 49.990 Hz, 50.000 Hz or 50.010 Hz. This adaptation is performed centrally by the grid operator and is taken into account when using secondary control power (SCP) and minute reserve power (MRP).

In accordance with one particular configuration of the present invention, the predefined frequency can be slightly varied, for example for adaptation to the universal time. This can be carried out for example by an active communication of the corresponding data by the grid operator.

For details concerning the control of control power and concerning information exchange with the grid operators, reference is made to the grid technology/grid operation forum in the VDE (FNN) "TransmissionCode 2007" of November 2009.

Currently, for the sources for providing primary control power, there are two tolerances that are relevant with regard to the frequency deviations. Firstly, this is the frequency measurement accuracy. The latter may be a maximum of +/−10 mHz. In addition, there is a so-called insensitivity range of a maximum +/−10 mHz that is granted to the sources which provide primary control power. In order at all events to prevent the control power sources from acting counter to the direction wanted, the transmission grid operators in Germany have stipulated in their framework agreements, for example, a band of +/−10 mHz around the desired value of 50.00 Hz in which no primary control power should be provided. Even with maximum frequency measurement accuracy of +10 mHz or −10 mHz, provision of control power counter to the direction wanted is thus ruled out. Outside these limits, control power has to be provided in accordance with the contractual conditions.

At present, in Europe, control power is provided in full as from a specific maximum deviation of the grid frequency (actual alternating current frequency) from the predefined frequency (setpoint alternating current frequency), with a deviation of +/−200 mHz. In the range between the dead band and the maximum deviation, in Europe it is intended that only a certain proportion of the maximum control power that can be provided is fed into the electrical grid. The type of provision of control power is not critical for the present invention. According to the regulations valid at present in Europe, the amount of power to be provided should be increased largely linearly with increasing frequency deviation from the predefined frequency. Thus, usually when there is a deviation of 100 mHz, a control power that is 50% of the maximum power is provided. Said maximum power is provided in the case of a deviation of 200 mHz and corresponds to the above-defined nominal power or contracted maximum power for which the energy store is at least prequalified. Accordingly, 25% of the nominal power is provided in the case of a deviation of 50 mHz.

It should be noted that the method makes it possible to achieve a contribution for stabilizing the grid even in the case of a relatively low capacity of the energy store since provision of control power can also take place if the grid frequency, over a very long period of time, is outside the dead band within which no control is necessary.

According to the invention, an energy store that can take up and output electrical energy is used for carrying out the method. The type of energy store is not important for carrying out the present invention.

In accordance with one preferred aspect of the present invention, a system comprising an electrochemical element can be used as energy store. Preferably, provision can be made for the electrochemical element used to be an energy storage system on the basis of hydrogen, a redox flow element and/or a galvanic element, preferably an accumulator.

Accumulators are, in particular, lead-acid accumulators, sodium-nickel chloride accumulators, sodium-sulfur accumulators, nickel-iron accumulators, nickel-cadmium accumulators, nickel-metal hydride accumulators, nickel-hydrogen accumulators, nickel-zinc accumulators, sodium-ion accumulators, potassium-ion accumulators and lithium-ion accumulators.

In this case, preference is given to accumulators having a high efficiency and a high operational and calendrical lifetime. To the preferred accumulators accordingly belong, in particular, lithium-ion accumulators (e.g. lithium-polymer accumulators, lithium-titanate accumulators, lithium-manganese accumulators, lithium-iron-phosphate accumulators, lithium-iron-manganese-phosphate accumulators, lithium-iron-yttrium-phosphate accumulators) and further developments thereof, such as, for example, lithium-air accumulators, lithium-sulfur accumulators and tin-sulfur-lithium-ion accumulators.

Lithium-ion accumulators, in particular, are particularly suitable for methods according to the invention on account of their fast reaction time, that is to say both with regard to the response time and with regard to the rate with which the power can be increased or reduced. In addition, the efficiency is also good particularly in the case of lithium-ion accumulators. Furthermore, preferred accumulators exhibit a high ratio of power to capacity, this characteristic value being known as the C-rate.

Furthermore, energy stores that are not based on electrochemical elements can be used for carrying out the present invention.

Preferably, provision can be made for the used energy store that is not based on an electrochemical element to be a flywheel, a heat accumulator, a natural gas generator with gas-fired power plant, a pumped-storage power plant, a compressed-air storage power plant and/or a superconducting magnetic energy store, or combinations ("pools") of stores or of stores with conventional control power sources or of stores with consumers and/or energy generators.

A heat accumulator operated as an energy store has to be operated together with a device for producing electricity from the stored thermal energy.

In accordance with one preferred embodiment, energy stores which comprise at least two different energy stores can be used. In this case, the energy stores can differ for example in their efficiency.

The efficiency of an energy store, in particular of an accumulator, defines the ratio between charge quantity and discharge quantity. At 100% efficiency, the entire charged energy would be available. Since, during the charging of an accumulator, part of the charged current can flow in secondary reactions or be lost as a result of self-discharge, the total charge introduced is no longer available for the discharge. Generally, the efficiency decreases both as a result of fast charging and as a result of fast discharging, since the losses at the internal resistance increase. Similar explanations also apply to the other types of energy store set out above.

The losses include, inter alia, thermal losses, for example as a result of the internal resistance of an electrochemical element or from mechanical frictions of a motor, incomplete chemical processes or self-discharge of an electrochemical element. Secondary components which are relevant to the entire storage system and require current in order to enable electrical energy to be stored should be taken into account in the determination of efficiency. In particular, they include pumps, compressors or cooling units, and also the energy necessary for the controller and/or for the energy management system.

In order to be able to compare the efficiency of a battery or of an accumulator with that of some other energy store (e.g. in the form of hydrogen), the efficiency indications generally relate to the energy efficiency, unless indicated otherwise.

The energy efficiency is determined according to:

$$\eta_{Wh} = \frac{E_{Ela}}{E_{Lad}}$$

wherein $E_{Ela}$ represents the energy that can be drawn and $E_{Lad}$ represents the energy fed in.

Since the efficiency of many accumulators is dependent on the current intensity of the charging and discharging processes and the charging and discharging temperature, for the purpose of determining the efficiency of the accumulator is charged with a current intensity of 0.2 C relative to the nominal capacity of the accumulator at a temperature of 25° C. and, directly after the charging process, is discharged with a current intensity of 0.2 C relative to the nominal capacity of the accumulator at 25° C. At a current intensity of 0.2 C relative to the nominal capacity of the accumulator, the accumulator is charged and respectively discharged within 5 hours.

The nominal capacity $Q_N$ (in Ah) in turn results from the mass m [kg] and the specific capacity q [Ah/kg] of the active electrode material at the time of production of the battery, wherein the following holds true: $Q_N = q \cdot m$.

If appropriate, the nominal capacity can be determined in accordance with the parameters given in DIN 40 729 for various types of battery. The nominal capacity is often indicated for commercial accumulators.

Provision can also be made for making it possible to store in the energy store an energy of at least 4 kWh, preferably of at least 10 kWh, in particular at least 20 kWh, particularly preferably at least 50 kWh, especially preferably at least 250 kWh.

In accordance with one further configuration, the energy store can have a capacity of at least 5 Ah, preferably at least 10 Ah and particularly preferably at least 50 Ah.

With the use of stores based on electrochemical elements, in particular accumulators, this store can advantageously be operated with a voltage of at least 1 V, preferably at least 10 V, and particularly preferably at least 100 V.

The capacity can be adapted to the nominal power and the defined period of time as defined above. Higher capacities are necessary for higher nominal powers and longer periods of time. With the use of at least two different energy stores which differ in their efficiency, for example, the ratio of the storage capacities of the at least two energy stores can be adapted to the performance thereof, taking account of the price differences. If there are very large differences in price and power, generally a relatively large difference in the capacities will be expedient.

The method of the present invention is carried out by means of a differential power provider. In this context, differential power providers are devices which differ from at least one of the energy stores likewise used and can provide the control power.

Preferably, the differential power provider can increase or decrease the power uptake and/or output within 30 s by at least 75%, preferably by at least 80%, and particularly preferably by at least 90%, of the maximum control power to be provided.

In accordance with one aspect of the present invention, an energy store having a low efficiency can also be used as differential power provider, such that the present invention is carried out using two energy stores which differ in their efficiency, wherein the energy store having the lower efficiency is used as differential power provider. Furthermore, the invention can be implemented such that an energy storage system comprising an electrochemical element is used as energy store and an energy storage system that is not based on an electrochemical element is used as differential power provider.

This configuration makes it possible to keep low the storage capacity of an energy store with a high efficiency, relative to the control power that can be provided, in particular the contracted maximum power, with the result that surprising cost advantages are obtained.

In accordance with one preferred configuration of the present invention, a differential power provider which does not constitute an energy store can be used. The differential power providers which do not constitute an energy store are, in particular, energy generators and/or energy consumers.

According to the invention, provision can be made for the energy generator used to be a power plant, preferably a coal power plant, a gas power plant or a hydroelectric power plant, and/or for the energy consumer used to be an industrial installation, for example a factory for manufacturing a substance, in particular an electrolysis factory or a metal factory, preferably an aluminum factory or a steel factory.

In this case, in particular, preference is given to such additional differential power providers which can also be used in connection with renewable energies, such as, for example, electrolysis factories or metal factories, the production of which can be reduced for providing positive control power.

As a result of this configuration, surprisingly, the nominal power of the energy store can be increased, without the capacity thereof having to be increased. In this case, the energy store can be provided with power by the additional differential power provider even in the case of a high grid loading in a very short time as necessary, without lengthy energy trading being required. Surprisingly, therefore, given a relatively low capacity of the store, a relatively high power can be output, which can generally be output only for a short period of time. As a result of the direct access to the additional differential power provider, the latter can, after a short time, produce or substitute the control power that is actually to be made available by the energy store. In this regard, in particular, the energy store can be regenerated by the energy or power of the additional differential power provider. In this case, the energy store contributes to the quality of the provision of control power, since a fast reaction time is achieved thereby. In contrast thereto, the additional differential power provider contributes primarily to the quantity, since it can supply control power at relatively low costs over a significantly longer time dictated by the design.

Furthermore, the use of at least one energy generator and/or energy consumer surprisingly makes it possible to increase the efficiency of these differential power providers, and so this embodiment is preferred. In this context, it should be noted, in particular, that preferred differential power providers do not have their maximum efficiency for a short-term maximum power, but rather slightly below that. In the course of providing control power, although the efficiency decreases according to the requirements, the infrequent use of the differential power providers enables the efficiency to be increased as viewed over a long period of time, for example a calendar year, relative to the case where all the control power would have to be provided by the differential power provider.

In this case, one or a plurality of differential power providers can be used for carrying out the present method, wherein one or a plurality of energy generators, one or a plurality of energy consumers and combinations of energy generators with energy consumers can be used.

In accordance with a first embodiment of the present invention, exclusively one or a plurality of energy generators which provide both positive and negative control power can be used as differential power provider. This embodiment enables simple control and is based on tried and tested techniques.

In accordance with a second embodiment of the present invention, exclusively one or a plurality of energy consumers which provide both positive and negative control power can be used as differential power provider. This embodiment is likewise distinguished by simple control and can furthermore be used very well in combination with renewable energies. Furthermore, the emission of carbon dioxide can be reduced as a result.

In accordance with a third embodiment of the present invention, at least one energy generator and at least one energy consumer can be operated jointly as differential power provider, wherein the power drawn from the electrical grid by the energy consumer is restricted in order to provide a positive control power, and the power fed into the electrical grid by the energy generator is restricted in order to provide a negative control power. This embodiment requires somewhat more complex control than the first two embodiments, but this embodiment is particularly expedient even with energy generators and/or energy consumers for which the maximum efficiency is near a short-term maximum power. As a result, the respective device can be operated independently of the power at which the optimum efficiency is provided. If the optimum efficiency for an energy generator is at 100% of the power, for example, then this configuration makes it possible for a positive control power to be provided for example by restricting the energy consumer, whereas the energy generator is operated at an optimum efficiency.

Furthermore, provision can be made for the energy generator and/or the energy consumer individually or in the pool to have a power of at least 10 kW, preferably at least 100 kW, particularly preferably at least 1 MW, and especially preferably of at least 10 MW.

The ratio of the nominal power of the energy store to the maximum power of the additional differential power provider can preferably be in the range of 1:10 000 to 100:1, particularly preferably in the range of 1:1000 to 40:1. In this case, the nominal power of the energy store relates to the total power of all the elements of the energy store, wherein energy stores which do not constitute an electrochemical element should also be taken into account.

In this case, the above-explained units of a device for carrying out the method according to the invention, in particular the energy store and the differential power provider, can be arranged in spatial proximity or can be installed over a relatively large distance from one another. What is essential is that both units are controlled jointly via a central control unit, wherein this can be realized in particular by a common management system. In this case, the individual elements of the device can each have a subsystem that performs partial control tasks.

According to the present invention, the AC electrical grid operates at a predefined frequency, as set out above. A frequency band is defined around said predefined frequency, wherein the control power to be provided in the case of a frequency deviation within the frequency band is provided by the energy store to the extent of more than 50%, preferably to the extent or more than 80%, and particularly preferably to the extent of more than 90%, relative to the total control power to be provided. The differential power provider provides the remaining part of the control power, with preference at most 40%, preferably at most 20% and particularly preferably at most 10%, relative to the total control power to be provided, which is to be provided in the case of a frequency deviation within the frequency band. It should be noted, however, that the differential power provider can be used for setting the state of charge of the energy store.

Furthermore, provision can be made for the control power to be provided in the case of a frequency deviation outside the frequency band to be provided by the differential power provider to the extent of more than 50%, preferably to the extent of more than 80%, and particularly preferably to the extent of more than 90%, relative to the control power to be provided for the frequency deviation outside the frequency band. This configuration is expedient particularly for differential power providers for which there is a great decrease in the efficiency when control power is made available. This is applicable, for example, if only one energy consumer or one energy generator is used as differential power provider, such that this installation has to be operated at a power below the efficiency optimum.

Depending on the configuration of the device for carrying out the method according to the invention, in the case of a frequency deviation outside the frequency band, the control power to be provided can be provided by the differential power provider to the extent of more than 50%, preferably to the extent of more than 80%, and particularly preferably to the extent of more than 90%, relative to the total control power to be provided. As a result, the energy store can be conserved and possibly regenerated. The energy store provides the remaining part of the control power, with preference at most 40%, preferably at most 20%, and particularly preferably at most 10%, which is to be provided in the case of a frequency deviation outside the frequency band, relative to the control power to be provided for the frequency deviation outside the frequency band or to the total control power to be provided.

In this case, the frequency band defined around the predefined frequency can differ from the frequency range which serves to describe the provision of control power in accordance with the standard predefined stipulations. In this regard, hereinafter the term dead band is used to explain the provision of control power in accordance with the standard predefined stipulations, whereas the term frequency band describes a range of frequencies which serves to define whether a deviation between grid frequency and predefined frequency is present, which leads to the use of the differential power provider, as described above and below.

In this case, the frequency band defined around the predefined frequency can correspond to the dead band; alternatively, it can be smaller than the dead band and, in accordance with one preferred alternative, the dead band can be smaller than the frequency band.

Preferably, a unit with a high measurement accuracy can be used for determining the grid frequency, in particular the average grid frequency. One particularly preferred configuration of the invention can provide for the frequency deviation to be measured with an inaccuracy of a maximum of ±8 mHz, particularly preferably of a maximum of ±4 mHz, very particularly preferably of a maximum of ±2 mHz, especially preferably of a maximum of ±1 mHz.

The bandwidth of the frequency band and/or the position of the frequency band which is defined around the predefined frequency can be chosen depending on the requirements. In this case, the frequency band can have a fixed width and a fixed position. By way of example, the frequency band can be defined symmetrically around the predefined frequency. The controller required for this purpose can be configured in a relatively simple fashion. Surprising advantages can be obtained by virtue of the bandwidth of the frequency band and/or the position of the frequency band which is defined around the predefined frequency being chosen depending on the state of charge of the energy store.

Furthermore, provision can be made for the frequency band which is defined around the predefined frequency to have a bandwidth in the range of 20 to 400 mHz, preferably 80 to 300 mHz and particularly preferably 100 to 150 mHz. In the case of a dependence of the width of the frequency band on the state of charge of the energy store, these values represent the maximum values which are set for an optimum state of charge. In the case of a deviation of the state of charge from the optimum state of charge or state of charge to be striven for, the frequency band can be chosen to be narrower.

Furthermore, the position of the frequency band which is defined around the predefined frequency can be adapted to the conditions. A frequency band defined symmetrically around the predefined frequency can be implemented in a particularly simple fashion. In accordance with a first preferred configuration, however, the position of the frequency band can be shifted relative to the predefined frequency such that the feed-in and output losses described in the introductory part of this document are compensated for on average. Accordingly, on average the energy store provides more negative than positive control power, wherein this shift is dependent on the efficiency and/or a possible self-discharge of the energy store. The optimum values for this can easily be obtained by means of an optimization. Surprising advantages can furthermore be obtained by the position of the frequency band being made dependent on the state of charge of the energy store. In the case of a high state of charge of the energy store, the frequency band can be shifted such that increasingly positive control power is provided, whereas increasingly negative control power is provided in the case of a low state of charge of the energy store.

The state of charge of the energy store to be aimed for may preferably lie in the range from 20 to 80% of the capacity, particularly preferably in the range from 40 to 60%. The compliance with and/or return to these state-of-charge ranges can be achieved, for example, by use of the operating procedure on which this invention is based, and/or by means of the energy trading explained in greater detail above, via the electrical grid. The state of charge corresponds, in particular in the case of accumulators as energy store, to the state of charge (SoC) or the energy content (state of energy, SoE).

In this case, the state of charge can be determined by means of the energy exchange, which can be estimated or directly measured by corresponding methods during discharging and charging processes. The measuring instruments necessary for this purpose are commercially available, wherein the state of charge can be measured continuously or at intervals.

The sought state of charge of the energy store may depend on predicted data. In this regard, in particular, consumption data can be used for determining the optimum state of charge, said consumption data being dependent on the time of day, the day of the week and/or the season.

Provision can also be made for the power of the energy store that is output to the electrical grid or the power of the energy store that is taken up from the electrical grid to be measured at a plurality of instants, in particular continuously, and for the state of charge of the energy store to be calculated at a plurality of instants, preferably continuously.

The provision of the control power within the frequency band defined around the predefined frequency is predominantly effected by the energy store, whereas in the case of a grid frequency outside the frequency band preferably at least part of the control power is provided by the differential power provider. In this case, the differential power provider can be connected in accordance with the inertia of the differential power provider, such that the control power is provided exclusively by the energy store in the case of very short-term deviations. In this case, for conserving and/or regenerating the energy store, outside the frequency band, the control power can also be supplied completely by the differential power provider. In this case, the transitions can be chosen according to the inertia of the differential power provider, such that even relatively sluggish systems can be used in a device for carrying out the present invention. Upon the grid frequency returning to the range of the frequency band set out above, an excess power caused by the inertia of the differential power provider can be used for regenerating the energy store.

Surprising advantages can be obtained by the differential power provider not being connected in the case of every very short-term frequency deviation outside the frequency band defined around the predefined frequency, but rather only in the case of a permanent frequency deviation over a defined period of time. In accordance with this embodiment, a check is made to determine whether the grid frequency is permanently outside the frequency band defined around the predefined frequency. In the case of a permanent deviation of the grid frequency over a defined period of time, at least part of the control power to be provided is provided by the differential power provider.

The defined period of time depends on the conditions of the device for carrying out the present method. Said conditions include for example the inertia of the differential power provider, the performance and the capacity of the energy store. Advantageously, the defined period of time can be, for example, in the range of 1 second to 8 hours, preferably 30 seconds to 1 hour, preferably 1 minute to 30 minutes and particularly preferably 2 minutes to 15 minutes. In this case, the defined period of time can also be made variable, wherein said period of time can be chosen for example from the state of charge of the energy store. The values mentioned above apply as maximum value in the case of variable periods of time. Depending on the type of control power to be provided and the state of charge, these periods of time can be shortened, such that the differential power provider is connected more rapidly in the case of a low state of charge and a positive control power request.

There is a permanent frequency deviation outside the frequency band if, over the defined period of time as set out above, the grid frequency is at least 60%, preferably at least 80%, preferably at least 90%, especially preferably at least 95% and particularly preferably at least 99%, either above or below the frequency band. In accordance with one particularly preferred configuration, a permanent frequency deviation outside the frequency band means that the frequency is outside the frequency band over the entire period of time.

If there is a permanent frequency deviation outside the frequency band over a defined period of time, control power can be provided by the differential power provider after this defined period of time. In this case, the control power can be provided completely by the differential power provider. Preferably, the energy store in combination with the differential power provider can provide control power. In accordance with one preferred embodiment, in this case short-term fluctuations can be moderated by the energy store, while the differential power provider provides a relatively constant control power.

In accordance with one preferred embodiment, by means of moving averaging of the grid frequency it is possible to determine whether control power is intended to be provided by the differential power provider.

Moving averaging means that not all of the data points are used for calculating the average value, but rather only some of them. Preferably, the data which were determined over a period of time corresponding at most to triple, preferably at most to double, the stipulated period of time defined previously are taken into account for calculating the moving average. In particular, it is also possible for only part of the stipulated period of time defined previously to be involved. By way of example, the period of time over which the values for determining the moving average are collected can be in the range of 30 seconds to 2 hours, preferably 1 minute to 1 hour and particularly preferably 2 minutes to 15 minutes.

In this case, the average values can be formed in a wide variety of ways, such as, for example, a simple shift, without weighting of the data (simple moving average (SMA)). In accordance with one preferred embodiment, a weighted moving average (WMA), in which the more recent data preferably have a higher weight than the older data, can be used for determining the variable frequency. In this case, a simple weighting can be performed or an exponential smoothing can be carried out. In this case, the number of data points depends on how often the frequency measurement is performed, wherein the average values of the data can also be used for reducing the memory space. In accordance with one preferred embodiment, at least 10 data points which can be used for determining the average value are formed within a period of time of 1 minute.

Furthermore, provision can be made for the differential power provider to take up or output no energy for providing control power in the case of a short-term frequency deviation outside a frequency band defined around the predefined frequency. In this case, the expression "short-term frequency deviation outside a frequency band defined around the predefined frequency" represents an antonym to a permanent frequency deviation outside a frequency band over a defined period of time, as was defined above. Accordingly, the invention is preferably implemented such that control power for frequency deviations present with a high oscillation frequency is provided preferably exclusively by the energy store, while the differential power provider is used for providing control power for frequency deviations which have a low oscillation frequency.

In this case, Fourier analyses can preferably be used, wherein the frequency bands for which the energy store is used are preferably chosen such that the differential control power provider is used preferably at most 10% of the time, particularly preferably at most 5% of the time, and especially preferably at most 3% of the time, relative to the calendar year.

In accordance with one particular configuration, a regeneration of the energy store can take place even if the measured frequency is outside one limit of a dead band for a relatively long period. This configuration is suitable for optimizing the state of charge particularly in connection with the manner of utilizing tolerances for example with regard to the level of providing control power, the time within which the control power should be provided, and the frequency tolerances.

By way of example, negative control power can be provided to an increased extent if the state of charge of the energy store is very low on account of a grid frequency which is below the predefined frequency on average over a relatively long period of time. In this case, tolerances, for example the tolerances allowed by the network operator to the differential power provider, with regard to the grid frequency, the level of control power dependent on the frequency deviation, the insensitivity with regard to the change in frequency, and the period of time within which the control power is to be provided, can be used to adapt the state of charge of the energy store to the requirements. In this regard, instead of the envisaged negative control power, for example at least 105%, preferably at least 110% and particularly preferably at least 115% of said control power can be provided. If positive control power then has to be provided in the case of a low state of charge, the power that is contractually to be provided is provided as accurately as possible in this case. Furthermore, energy can be taken up directly in the case of a low state of charge, while energy is fed in at the latest possible time in accordance with the regulations or with the slowest possible rise in accordance with the regulations. Furthermore, the frequency tolerance allowed by the grid operator can be used by virtue of a measurement being carried out with a higher accuracy, the difference obtained thereby with respect to the allowed measurement inaccuracy being used in a targeted manner, in order, in accordance with the regulations, i.e. within the given tolerance framework, in the case of a low state of charge, to feed as little power as possible into the grid or to take up as much power as possible from the grid. The procedure the other way around can be adopted in the case of a high state of charge. In this regard, by way of example, a high energy output in the case of providing a positive control power and a low energy uptake in the case of providing a negative control power are possible or can be realized.

The tolerance with regard to the absolute value of the control power provided and the tolerance when determining the frequency deviation, etc. should be understood, according to the invention, to mean that certain deviations between an ideal desired power and the control power actually provided are accepted by the grid operator, on account of technical boundary conditions, such as the measurement accuracy when determining the control power produced or the grid frequency. The tolerance can be granted by the grid operator, but could also conform to a legal predefined stipulation.

In accordance with one particular configuration, the feeding of energy into the energy store may be dependent on the time of day. As a result, it is possible to ensure a high stability of the grid even in the case of a high load at specific times of day. In this regard, in the case of peak loads, it is possible to rule out a regeneration of the energy store that would be practical on account of the deviation of the grid frequency from the predefined frequency over a relatively long period of time.

Furthermore, provision can be made for a plurality of energy stores to be used according to the present method. In one particular configuration, in this case all or only some of these energy stores can provide control power adapted to the state of charge of the energy stores, as was explained above.

The size of the energy stores within the pool can vary in this case. In one particularly preferred embodiment, in the case of the various energy stores of a pool with the utilization of tolerances, in particular the choice of the bandwidth in the dead band, the change from one parameter setting to another is not performed synchronously but rather deliberately with a temporal offset, in order to keep possible disturbances in the grid as small as possible or at least tolerable.

In a further preferred embodiment, the tolerances used in the various procedures, in particular the choice of the bandwidth in the dead band, vary depending on the time of day, the day of the week or the season. By way of example, tolerances can be defined more narrowly in a period of from 5 min before to 5 min after the hour change. This is owing to the fact that very rapid frequency changes often take place here. It may be in the interests of the transmission grid operators for there to be lower tolerances here and thus for the control energy to be provided more certainly in the sense of more rigorously.

According to a further embodiment, it may be provided within the provisions for providing control power that on average more energy is taken up from the grid by the energy store used in the present method than is fed in. This may take place because, according to the regulations including the previously set out procedure, preferably a very large amount of negative control power is provided, whereas, according to the regulations including the previously set out procedure, preferably only the minimum assured amount of positive control power is provided. Preferably, on average at least 0.1% more energy is drawn from the grid than is fed in, in particular at least 0.2%, preferably at least 0.5%, particularly preferably at least 1.0%, especially preferably 5%, these values being related to an average that is measured over a time period of at least 15 minutes, preferably at least 4 hours, particularly preferably at least 24 hours and especially preferably at least 7 days, and relating to the energy fed in.

In this case, the provision of control power as set out above can be used in a targeted manner in order to draw a maximum of energy from the grid, wherein the maximum possible negative control power is provided, whereas only a minimum of positive control power is provided.

In the embodiments regarding the preferred, and especially maximum, energy take-up, the energies thereby drawn from the grid can be sold through the previously described energy trading, this preferably taking place at times at which a price that is as high as possible can be achieved. For this purpose, it is possible to consult price trend forecasts that are based on historical data.

Furthermore, the state of charge at the time of planned selling of energy may be preferably at least 70%, particularly preferably at least 80%, and particularly preferably at least 90%, of the storage capacity, the state of charge after selling being preferably at most 80%, in particular at most 70%, and particularly preferably at most 60%, of the storage capacity.

Depending on the profile of the frequency deviation, control power can be fed into the AC electrical grid in a constant fashion, by means of pulses or by means of ramps, characterized by a rise in the feeding-in of power over a defined period of time.

A control power provided by means of pulses makes it possible to improve the efficiency of the device and the method for providing control power, since, as a result, the power electronics required, particularly with the use of accumulators, can be operated at a higher efficiency. A pulse should be understood to mean a temporally limited jerky current, voltage or power profile, wherein these pulses can also be used as a repeating sequence of pulses. The duty cycle according to DIN IEC 60469-1 can be chosen here depending on the type of power electronics and the control power to be provided, said duty cycle being in the range of greater than zero to 1, preferably in the range of 0.1 to 0.9, particularly preferably in the range of 0.2 to 0.8.

In the case of power changes that become necessary, provision can preferably be made for the power of the energy store to be increased depending on the magnitude of the required power change over a period of at least 0.5 s, preferably over a period of at least 2 s, particularly preferably over a period of at least 30 s.

These slower ramps ensure that excitations of undesired disturbances or oscillations in the electrical grid or at the connected consumers and generators as a result of an excessively steep power gradient do not occur.

The method of the present invention can preferably be carried out by means of a device comprising at least one energy store, at least one differential power provider and a controller for controlling the power of the energy stores and differential power providers in an open-loop or closed-loop manner, wherein the differential power providers are connected to an electrical grid in such a way that energy can be fed into the electrical grid and can be drawn from the electrical grid by the device.

Preferably, the differential power provider is a controllable block-type power plant comprising at least two steam turbines which operate at a different pressure, wherein a control valve is arranged between boiler and high-pressure turbine and a valve is arranged between preheater and medium- and low-pressure turbine.

In order to reduce the electrical power of the power plant momentarily, it is possible to reduce the steam mass flow rate by means of a control valve between boiler and high-pressure turbine (HP turbine). The electrical power is increased momentarily by the increase of the steam mass flow, which is expanded by means of the medium- and low-pressure turbine (MP/LP turbine). For this purpose, a valve between MP/LP turbine and preheater is completely or partly closed. It is particularly advantageous that the outlined methods for increasing and for reducing the electrical power by means of said control valves lead to negligible averaged losses. The reason for this is that the efficiency of the power plant is reduced only at the instant when differential power is provided, and—as described—this is the case only for a short period and comparatively infrequently. The present-day permanent losses when "keeping available" the control power are thus avoided.

A controllable block-type power plant with a block controller can comprise an integrated condensate build-up and a turbine control valve.

Furthermore, provision can be made for the differential power provider to be a combined heat and power installation (CHP installation) comprising at least one heat accumulator. Said combined heat and power installation can preferably change the output power within 30 s according to the control power requirements.

In CHP installations, the thermal energy is also utilized alongside the electrical energy, thus resulting in a relatively high total degree of utilization of 80 to 90%. The installations can be designed and operated as either electricity- or heat-managed. In the case of electricity-managed installations, the use of heat accumulators is additionally expedient since the electricity generation can thereby be controlled independently of the demand of the heat consumers.

In accordance with one preferred embodiment, the controller can be connected to a unit for determining the time duration and a unit for determining a permanent frequency deviation.

In this case, provision can be made for the device to comprise a frequency measuring unit for measuring the grid frequency of the electrical grid and a data memory, wherein at least one limit value (for example predefined frequency±10 mHz, predefined frequency±200 mHz etc.) of the grid frequency is stored in the memory, wherein the controller is designed to compare the grid frequency with the at least one limit value and to control the power of the energy store and, if appropriate, of the differential power provider, preferably of the energy consumer and/or of the energy generator depending on the comparison.

With the use of at least two different energy stores which differ in their efficiency, for example, said controller can also control the power of the at least two energy stores. In this case, provision can be made for said controller to address a subsystem, in particular a management system, which controls the respective power of the at least two energy stores to the total power required by the superordinate controller, if appropriate taking account of the preferred configurations of the present method as set out above.

According to the invention, in the present case, a controller is understood to mean a simple open-loop controller. In this case, it should be noted that any closed-loop controller encompasses an open-loop controller since a closed-loop controller carries out control over and above open-loop control in a manner dependent on a difference between an actual value and a desired value. Preferably, therefore, the controller is embodied as a closed-loop controller, in particular with regard to the state of charge. Particularly preferably, the controller is a control system.

The unit for determining a permanent frequency deviation can be configured in accordance with the explanations above. Accordingly, said unit for determining a permanent frequency deviation can comprise for example a device for determining an average value. Furthermore, said unit for determining a permanent frequency deviation can comprise a memory in which the size of a frequency deviation is recorded. In this case, the absolute deviation can be recorded. In a further configuration, it is possible to record whether or not said frequency deviation exceeds a previously defined size, for example a frequency band defined around the predefined frequency. The unit for determining the time duration serves, in particular in combination with a unit for determining a permanent frequency deviation, to stipulate whether or not the differential power provider is used. In this case, said unit for determining the time duration can comprise a data memory in which the time duration of the frequency deviation is recorded, which can be determined by the unit for determining a permanent frequency deviation. Accordingly, data can be exchanged between the unit for determining the time duration and the unit for determining a permanent frequency deviation. In this case, both units can be combined in one device.

Alternatively, the data are collected at a remote site and evaluated as set out above and the corresponding signal is suitably transmitted to the store or stores for providing control power. In one particularly preferred embodiment, this can be carried out by means of the known methods of remote data transmission and communication.

For further description of a preferred device, reference is made to the description of the method according to the invention as set out above, in order to avoid repetition, these explanations correspondingly also applying to the device.

Figure 2:
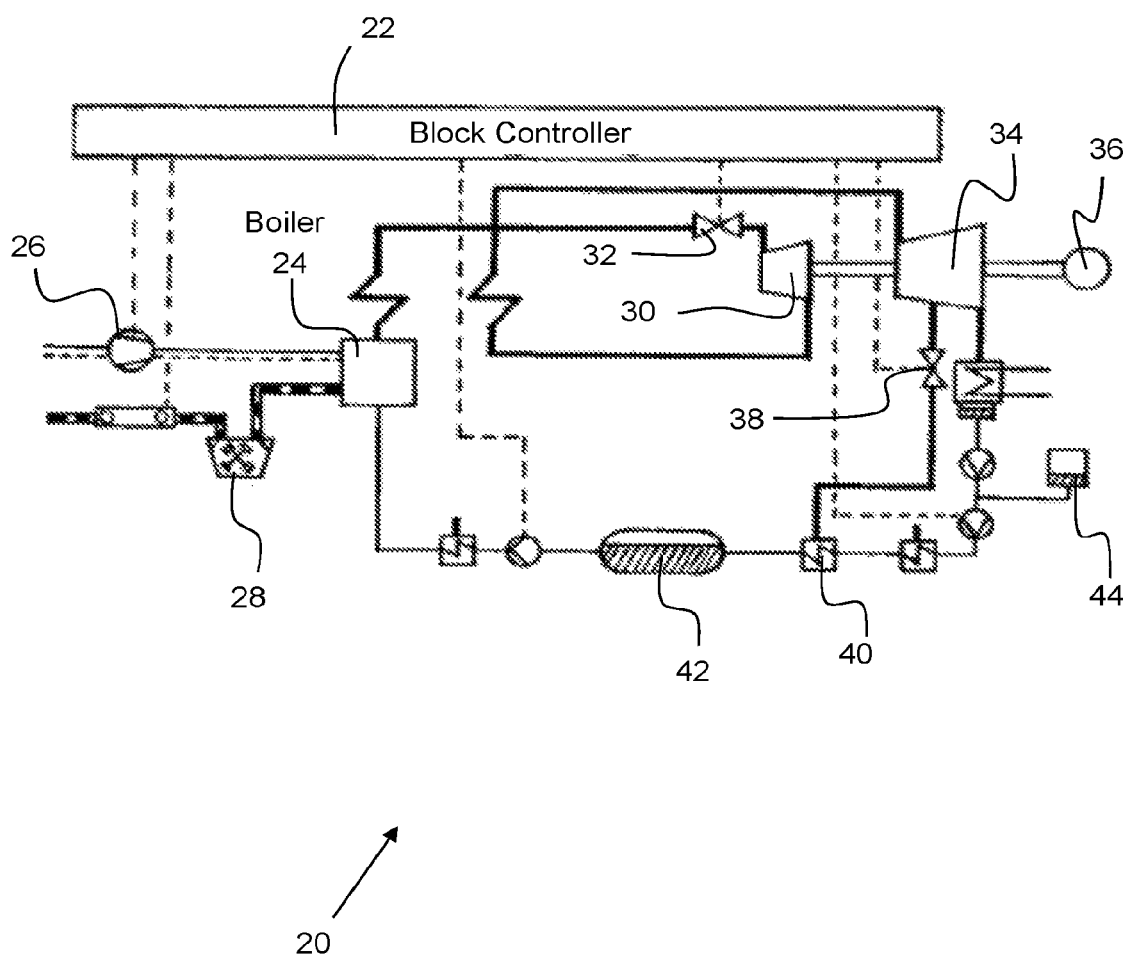
FIG. 2: shows a schematic illustration of a block-type power plant which can preferably be used as differential power provider.
Figure 3:
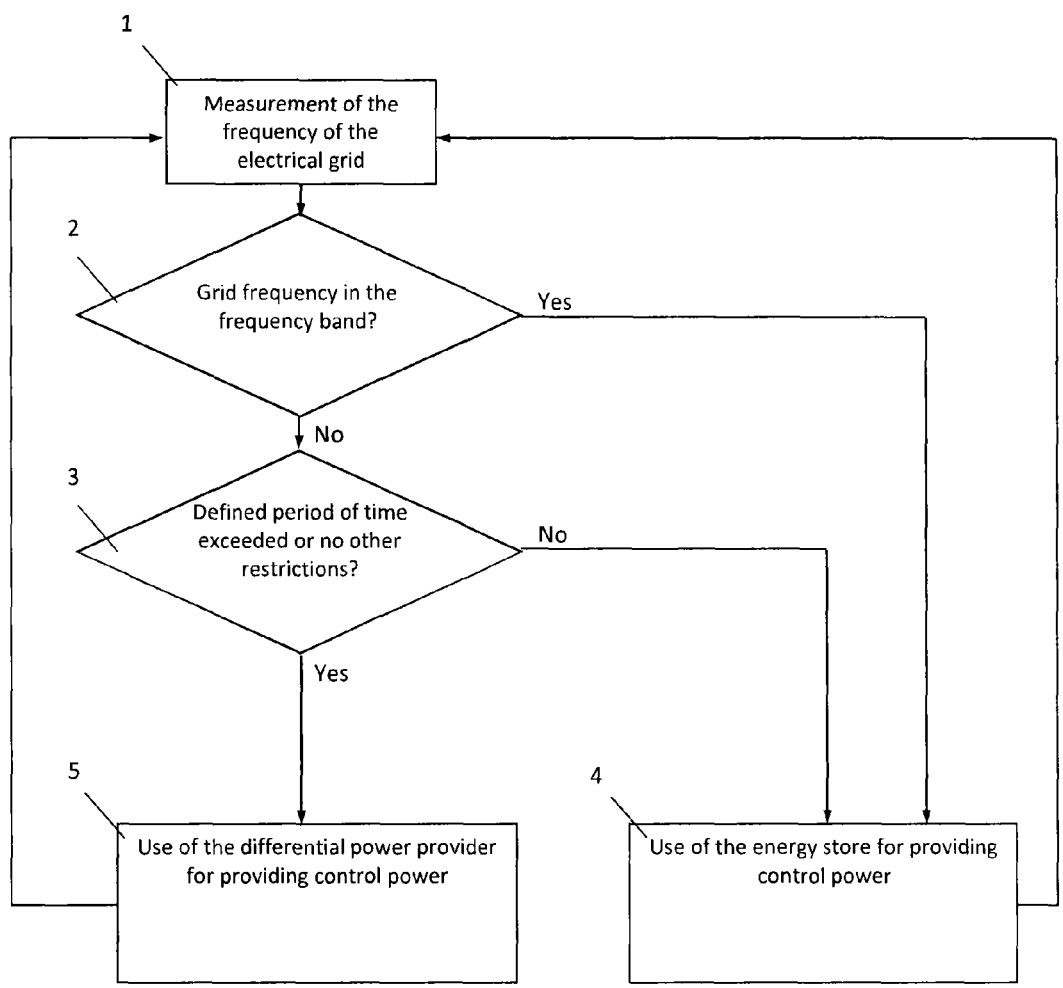
FIG. 3: shows a flow chart for a method according to the invention.

Exemplary embodiments of the invention are explained below with reference to two schematically illustrated figures, but without restricting the invention here. In detail:

FIG. 1: shows a schematic illustration of a device according to the invention for providing control power;

FIG. 2: shows a schematic illustration of a block-type power plant which can preferably be used as differential power provider, and FIG. 3: shows a flow chart for a method according to the invention.

FIG. 1 shows a schematic construction of a preferred embodiment of a device 10 for a method according to the invention, comprising a controller 11, an energy store 12 and a differential power provider 13. The energy store 12 can generally comprise a management system which controls the charging or discharging. Said management system is generally connected to the controller 11. In this case, said management system can be spatially separated from the controller 11 or accommodated with the latter in a housing.

Lithium-ion accumulators are particularly suitable as energy store, wherein said accumulators can be quickly and frequently charged and discharged with minor harmful influences on the accumulator, such that lithium-ion accumulators are particularly suitable and preferred according to the invention for all of the exemplary embodiments. For this, lithium-ion accumulators with a considerable capacity must be provided. These can for example be easily accommodated in one or more 40-foot ISO containers. Furthermore, lead-acid accumulators, redox flow batteries and energy storage systems on the basis of hydrogen can be used as energy store.

Furthermore, the device for carrying out the method according to the invention comprises at least one differential power provider 13, wherein the latter differs from the energy store 12. Preferably, energy generators and/or energy consumers, in particular, can be used as differential power provider 13, wherein one energy generator that can particularly preferably be used is a block-type power plant, for example.

In the embodiment illustrated in FIG. 1, the energy store 12 and the differential power provider 13 are connected to an electrical grid 16. Furthermore, in the present illustration, the differential power provider 13 is connected to the energy store 12, such that the power that can be provided by the differential power provider 13 can be fed directly into the electrical grid 16 or be used for regenerating the energy store 12.

In this case, the controller 11 is connected to the energy store 12 and the differential power provider 13. In accordance with one preferred embodiment, the controller 11 is connected to a unit for determining the time duration 14 and a unit for determining a permanent frequency deviation 15. These units can, of course, be spatially accommodated in a housing with the controller. The connection between the unit for determining the time duration 14 and the unit for determining a permanent frequency deviation 15 with the controller 11 allows communication of the data determined, which are processed in the controller unit.

Furthermore, the controller 11 can be connected to the electrical grid 16, wherein this connection, which is not illustrated in FIG. 1 can allow communication of enquiries for required control power, both positive and negative.

FIG. 2 shows a schematic illustration of a block-type power plant that can preferably be used as differential power provider. The block-type power plant 20 comprises a block controller 22, by means of which the essential components of the block-type power plant 20 can be controlled. The control lines required for this purpose are illustrated in a dashed manner in FIG. 2. The block-type power plant 20 illustrated in the present case comprises a boiler 24, which is supplied with fuel and oxygen by a fresh air feed 26 and a coal mill 28, wherein a gas-operated boiler can also alternatively be used. The steam generated in the boiler 24 is guided into a high-pressure turbine 30 for the purpose of generating electricity, a control valve 32 being arranged in this line, by means of which control valve the steam mass flow rate can be controlled. Afterward, the steam is guided into a low-pressure turbine 34, wherein two turbines (medium- and low-pressure turbines) can also be disposed one after another. The mechanical power is converted into electricity by means of a generator 36. A momentary increase of the electrical power is realised by the increase of the steam mass flow, which is expanded by means of the low-pressure turbine 34. For this purpose, a valve 38 between low-pressure turbine 34 and preheater 40 is completely or partly closed. The feed water which is preheated by the preheater 40 and which is obtained from condensation of the steam in or after the low-pressure turbine 34 is guided into a feedwater container 42 connected to the boiler 24, thus resulting in a circuit. Feed water can be supplied by a cold condensate store 44.

FIG. 3 shows a flow chart for a preferred method according to the invention. An energy store is used in the method. In step 1, the grid frequency of the electrical grid is measured. In decision step 2, a check is then made to determine whether the grid frequency is within or outside the frequency band that was defined beforehand. Said frequency band can be identical to a dead band predefined by the grid regulations or by the grid operator. Furthermore, said frequency band can be larger or smaller than the dead band determined by the grid operators or by the grid regulations.

If the measured grid frequency is within the frequency band, in accordance with the present embodiment of the method, control power is provided by exclusive use of the energy store, as is illustrated in step 4.

If the grid frequency is outside the frequency band, in decision step 3 a check is made to determine whether there is a permanent frequency deviation over a defined period of time. In this case, a check can likewise be made to determine whether the use of the differential power provider is indicated. This can be provided for example in the case of a low state of charge of the energy store. In the case of a short-term deviation of the grid frequency and a sufficient state of charge of the energy store, exclusively the energy store is used, as set out above, according to step 4.

If a permanent frequency deviation is present and no exceptional control is applicable, the differential power provider is used for providing control power, as set out in step 5.

Subsequently the grid frequency is once again measured, thus resulting in a circuit.

The features of the invention disclosed in the above description and also in the claims, figures and exemplary embodiments may be essential to the realization of the invention in its various embodiments both individually and in any desired combination.

The invention claimed is:

1. A method for providing control power to stabilize an AC electrical grid that operates at a predefined frequency, the method comprising:
   taking up and emitting electrical energy via an energy storage device; and
   providing the control power, using the energy storage device together with a differential power provider including:
      in a case of a frequency deviation within a frequency band defined around the predefined frequent, providing, by the energy storage device, more than 50% of a total of the control power to be provided, and
      in a case of a frequency deviation outside the frequency band, providing, by the differential power provider, more than 50% of the total of the control power to be provided.

2. The method as claimed in claim 1, wherein providing the control power using the energy storage device together with the differential power provider includes:
   in the case of the frequency deviation within the frequency band, providing, by the energy storage device, more than 80% of the total of the control power to be provided, and
   in the case of the frequency deviation outside the frequency band, providing, by the differential power provider, more than 80% of the total of the control power to be provided.

3. The method as claimed in claim 2, wherein the differential power provider includes at least one of a block-type power plant and a combined heat and power installation.

4. The method as claimed in claim 3, wherein the differential power provider includes an industrial installation.

5. The method as claimed in claim 2, wherein the differential power provider includes an industrial installation.

6. The method as claimed in claim 1, wherein at least one of a width of the frequency band and a position of the frequency band is chosen depending on a state of charge of the energy storage device.

7. The method as claimed in claim 6, wherein the frequency band has a bandwidth in a range of 20 to 400 mHz.

8. The method as claimed in claim 6, wherein providing the control power using the energy storage device together with the differential power provider includes:
   in the case of the frequency deviation within the frequency band, providing, by the energy storage device, more than 80% of the total of the control power to be provided, and
   in the case of the frequency deviation outside the frequency band, providing, by the differential power provider, more than 80% of the total of the control power to be provided.

9. The method as claimed in claim 8, wherein the differential power provider includes at least one of a block-type power plant and a combined heat and power installation.

10. The method as claimed in claim 9, wherein the differential power provider includes an industrial installation.

11. The method as claimed in claim 8, wherein the differential power provider includes an industrial installation.

12. The method as claimed in claim 1, further comprising:
   operating at least one energy generator and at least one energy consumer jointly as differential power provider,
   restricting power drawn from the AC electrical grid by the at least one energy consumer in order to provide a positive control power, and
   restricting power fed into the AC electrical grid by the at least one energy generator in order to provide a negative control power.

13. The method as claimed in claim 12, wherein at least one of a width of the frequency band and a position of the frequency band is chosen depending on a state of charge of the energy storage device.

14. The method as claimed in claim 13, wherein the frequency band has a bandwidth in a range of 20 to 400 mHz.

15. The method as claimed in claim 13, wherein providing the control power using the energy storage device together with the differential power provider includes:
   in the case of the frequency deviation within the frequency band, providing, by the energy storage device, more than 80% of the total of the control power to be provided, and
   in the case of the frequency deviation outside the frequency band, providing, by the differential power provider, more than 80% of the total of the control power to be provided.

16. The method as claimed in claim 15, wherein the differential power provider includes at least one of a block-type power plant and a combined heat and power installation.

17. The method as claimed in claim 16, wherein the differential power provider includes an industrial installation.

18. The method as claimed in claim 15, wherein the differential power provider includes an industrial installation.

19. The method as claimed in claim 1, wherein the differential power provider includes at least one of a block-type power plant and a combined heat and power installation.

20. The method as claimed in claim 19, wherein the differential power provider includes an industrial installation.

21. The method as claimed in claim 1, wherein the differential power provider includes an industrial installation.

22. The method as claimed in claim 1, wherein providing the control power using the energy storage device together with the differential power provider includes:
   in a case of a permanent frequency deviation outside the frequency band over a defined period of time, providing, by the differential power provider, more than 50%, and
   in a case of a permanent frequency deviation within the frequency band, providing, by the differential power provider, at most 20% of the total of the control power to be provided.

23. The method as claimed in claim 1, wherein the differential power provider includes exclusively one or a plurality of energy generators which provide both positive and negative control power.

24. The method as claimed in claim 1, wherein the differential power provider includes exclusively one or a plurality of energy consumers which provide both positive and negative control power.

25. The method as claimed in claim 1, wherein the differential power provider can increase or decrease at least one of power uptake and power output within 30 s by at least 75% of a maximum of the control power to be provided.

26. The method as claimed in claim 1, wherein the energy storage device is a lithium-ion accumulator.

27. The method as claimed in claim 26, wherein the lithium-ion accumulator can store at least an energy of 4 kWh.

28. A device for providing control power to stabilize an AC electrical grid that operates at a predefined frequency, the device comprising:
at least one energy storage device;
at least one differential power provider connected to the AC electrical grid in such a way that energy can be fed into the AC electrical grid and can be drawn from the AC electrical grid by the device; and
a controller configured to control power of the at least one energy storage device and the at least one differential power provider in an open-loop or closed-loop manner, wherein the controller is configured to:
in a case of a frequency deviation within a frequency band defined around the predefined frequency, control the energy storage device to provide more than 50% of a total of the control power to be provided, and
in a case of a frequency deviation outside the frequency band, control the differential power provider to provide more than 50% of the total of the control power to be provided.

29. The device as claimed in claim 28, wherein the controller is configured to:
in the case of the frequency deviation within the frequency band, control the energy storage device to provide more than 80% of the total of the control power to be provided, and
in the case of the frequency deviation outside the frequency band, control the differential power provider to provide more than 80% of the total of the control power to be provided.

30. The device as claimed in claim 29, wherein
the differential power provider includes a block-type power plant controllable in the closed-loop manner,
the block-type power plant includes at least two steam turbines which operate at a different pressure,
a control valve is provided between a boiler and a high-pressure turbine, and
a valve is provided between a preheater and a low-pressure turbine.

31. The device as claimed in claim 30, wherein the differential power provider includes an industrial installation.

32. The device as claimed in claim 29, wherein the differential power provider includes a combined heat and power installation comprising at least one heat accumulator.

33. The device as claimed in claim 32, wherein the differential power provider includes an industrial installation.

34. The device as claimed in claim 29, wherein the differential power provider includes an industrial installation.

35. The device as claimed in claim 28, wherein the controller is configured to choose at least one of a width of the frequency band and a position of the frequency band depending on a state of charge of the energy storage device.

36. The device as claimed in claim 35, wherein the frequency band has a bandwidth in a range of 20 to 400 mHz.

37. The device as claimed in claim 36, wherein the controller is configured to:
in the case of the frequency deviation within the frequency band, control the energy storage device to provide more than 80% of the total of the control power to be provided, and
in the case of the frequency deviation outside the frequency band, control the differential power provider to provide more than 80% of the total of the control power to be provided.

38. The device as claimed in claim 35, wherein the controller is configured to:
in the case of the frequency deviation within the frequency band, control the energy storage device to provide more than 80% of the total of the control power to be provided, and
in the case of the frequency deviation outside the frequency band, control the differential power provider to provide more than 80% of the total of the control power to be provided.

39. The device as claimed in claim 38, wherein the differential power provider includes i-s-a block-type power plant controllable in the closed-loop manner,
the block-type power plant includes at least two steam turbines which operate at a different pressure,
a control valve is provided between a boiler and a high-pressure turbine, and
a valve is provided between a preheater and a low-pressure turbine.

40. The device as claimed in claim 39, wherein the differential power provider includes an industrial installation.

41. The device as claimed in claim 38, wherein the differential power provider includes a combined heat and power installation comprising at least one heat accumulator.

42. The device as claimed in claim 41, wherein the differential power provider includes an industrial installation.

43. The device as claimed in claim 38, wherein the differential power provider includes an industrial installation.

44. The device as claimed in claim 28, wherein the controller is configured to:
jointly operate at least one energy generator and at least one energy consumer as the differential power provider,
restrict power drawn from the AC electrical grid by the at least one energy consumer in order to provide a positive control power, and
restrict power fed into the AC electrical grid by the at least one energy generator in order to provide a negative control power.

45. The device as claimed in claim 44, wherein the controller is configured to choose at least one of a width of the frequency band and a position of the frequency band depending on a state of charge of the energy storage device.

46. The device as claimed in claim 45, wherein the frequency band has a bandwidth in a range of 20 to 400 mHz.

47. The device as claimed in claim 46, wherein the controller is configured to:
in the case of the frequency deviation within the frequency band, control the energy storage device to provide more than 80% of the control power to be provided, and
in the case of the frequency deviation outside the frequency band, control the differential power provider to provide more than 80% of the total of the control power to be provided.

48. The device as claimed in claim 45, wherein the controller is configured to:
in the case of the frequency deviation within the frequency band, control the energy storage device to provide more than 80% of the total of the control power to be provided, and
in the case of the frequency deviation outside the frequency band, control the differential power provider to provide more than 80% of the total of the control power to be provided.

49. The device as claimed in claim 48, wherein
the differential power provider includes a block-type power plant controllable in the closed-loop manner,
the block-type power plant includes at least two steam turbines which operate at a different pressure,
a control valve is provided between a boiler and a high-pressure turbine, and
a valve is provided between a preheater and a low-pressure turbine.

50. The device as claimed in claim 49, wherein the differential power provider includes an industrial installation.

51. The device as claimed in claim 48, wherein the differential power provider includes a combined heat and power installation comprising at least one heat accumulator.

52. The device as claimed in claim 51, wherein the differential power provider includes an industrial installation.

53. The device as claimed in claim 48, wherein the differential power provider includes an industrial installation.

54. The device as claimed in claim 28, wherein
the differential power provider includes a block-type power plant controllable in the closed-loop manner,
the block-type power plant includes at least two steam turbines which operate at a different pressure,
a control valve is provided between a boiler and a high-pressure turbine, and
a valve is provided between a preheater and a low-pressure turbine.

55. The device as claimed in claim 54, wherein the differential power provider includes an industrial installation.

56. The device as claimed in claim 28, wherein the differential power provider includes a combined heat and power installation comprising at least one heat accumulator.

57. The device as claimed in claim 56, wherein the differential power provider includes an industrial installation.

58. The device as claimed in claim 28, wherein the differential power provider includes an industrial installation.

* * * * *